Patented Feb. 14, 1939

2,146,739

UNITED STATES PATENT OFFICE 2,146,739

COMPOSITION OF MATTER

Sheldon B. Heath, Midland, Mich., assignor to The Dow Chemical Company, Midland, Mich., a corporation of Michigan No Drawing. Application September 16, 1937, Serial No. 164,136

7 Claims. (Cl. 167—31)

This invention concerns compositions comprising mixtures of bentonite and 2.4-dinitro-6-cyclohexyl-phenol, in which the bentonite is dispersed in and through the phenol and held thereby as in solid suspension.

2.4-dinitro-6-cyclohexyl-phenol has been found to be of value in the control of insect parasites when applied as a component of insecticidal dusts, in water suspensions, as the solute in the oily phase of oil-water emulsion compositions, etc. In order that this compound may function with maximum utility for such purpose and in such compositions, it is desirable that it be obtainable in finely divided form. For example, when applied in water suspension or as a dust, the particle size of the 2.4-dinitro-6-cyclohexyl-phenol determines the coverage obtainable with any given amount thereof, and the probable degree of effectiveness resulting from such application. Oil-water emulsions containing 2.4-dinitro-6-cyclohexyl-phenol as a toxic ingredient are frequently produced by the tank-mix method. That is, the water, oil, 2.4-dinitro-6-cyclohexyl-phenol, and emulsifier are mixed together without warming in a spray tank in the field immediately prior to application. Furthermore, solution of this phenol and various organic solvents are preferably prepared by stirring the phenol compound with the solvent. In preparing solutions, suspensions, and emulsions as above, it is preferable that the 2.4-dinitro-6-cyclohexyl-phenol be employed in such a state of subdivision that it be quickly and completely dispersed in the water, oil, or solvent without the necessity of applying heat thereto.

Efforts to provide 2.4-dinitro-6-cyclohexyl-phenol in finely divided form, as by grinding, etc., have proven impractical due to the tendency of the compound to coalesce into balls which pack together. Furthermore, 2.4 - dinitro-6-cyclohexyl-phenol cannot be conveniently stored in finedly divided form, since the particles tend to grow together, giving rise to a product containing agglomerates, which is unsuited for use in insecticidal preparations where fineness of particle size is of paramount importance.

An object of this invention is to provide compositions comprising 2.4 - dinitro-6-cyclohexyl-phenol which on contact with water will disintegrate to give fine dispersions of the free phenol. A further object of the invention is to provide compositions comprising such phenol compound which may be roughly comminuted and thereafter stored indefinitely without undergoing change in particle size, or other chemical or physical alteration. A further object is to provide substantially anhydrous compositions comprising 2.4-dinitro-6-cyclohexyl-phenol adapted to be used in the preparation of insecticidal spray compositions. An additional object is to provide a method for the preparation of such compositions. Other objects of the invention will become apparent from the following specification.

I have discovered that the product obtained by mixing bentonite with fused 2.4-dinitro-6-cyclohexyl-phenol possesses the characteristic of rapidly disintegrating on contact with water or aqueous solutions to give a suspension of minute particles of 2.4 - dinitro-6-cyclohexyl-phenol. This substantially anhydrous fusion mixture does not readily absorb moisture from the air, and is not appreciably affected by exposure to air and light, or by prolonged storage. I have further found that such solid dispersions are well adapted for use in the preparation of insecticidal compositions, e. g. aqueous suspensions of solid 2.4-dinitro-6-cyclohexyl-phenol, dusts comprising the compound in finely divided form, and particularly tank-mix oil-water emulsions.

In preparing my new composition, bentonite is stirred into molten 2.4-dinitro-6-cyclohexyl-phenol, the resulting slurry solidified by cooling to form a hard, brittle cake, and the cake roughly comminuted as by crushing and grinding. The state of division of the substantially anhydrous product resulting from such comminution is not critical, although a material having an average particle size of from 10 to 60 mesh is to be preferred. The amount of bentonite stirred into the molten 2.4-dinitro-6-cyclohexyl-phenol may vary from 5 to 100 parts per 100 parts of the phenol, the preferred amount thereof depending on the purpose for which the cooled and ground material is to be employed. When wet with water and agitated, the mechanically held bentonite in the coarsely ground fusion mixture swells and disintegrates the particles to form a slurry of bentonite and an aqueous disperson of the 2.4-dinitro-6-cyclohexyl-phenol in extremely finely divided form. The dispersed dinitro-phenol compound is in the form of fine crystal segments some of which approach a size of 40 microns, the majority being about 2 microns in diameter. The percentage of 2 micron particles in the aqueous dispersion increases as increasing amounts of bentonite are employed in the fusion mixture and approaches 100 per cent as the proportion of bentonite employed therein approaches 50 per cent by weight of the mixture.

Wetting agents such as sulphite process waste liquor, "Spruce extract" sulphonated oils and fatty acids, sulphonated alcohols, blood albumen, phenol sulphonic acids, etc., may be included in the mixture, the presence of such materials therein decreasing the time required by the dry composition to become wet with and disintegrated in water. These wetting and dispersing agents can, if desired, be added to the fusion mixture in the molten state, although I generally prefer to make such addition to the cooled and roughly ground product by mechanical mixing.

A representative dry fusion mixture found particularly useful for insecticidal purposes has the following composition:

| | Parts by weight |
|---|---|
| 2.4-dinitro-6-cyclohexyl-phenol | 54 |
| Bentonite | 46 |
| Dried sulphite waste liquor ("Goulac") | 46 |

In preparing the above, the bentonite at a temperature of 90°–100° C., was slowly added with stirring to the molten 2.4-dinitro-6-cyclohexyl-phenol at temperatures gradually increasing from 100° to 120° C., The resulting mixture was a thick paste which was thereafter cooled to solidify the same, and the solid cake ground to an average particle size of 20 screen mesh. This product was found to disintegrate, when stirred with water, to give a glutinous suspension of swelled bentonite particles and a dispersion of 2.4-dinitro-6-cyclohexyl-phenol in water having an average particle size of approximately 2 microns. To facilitate the wetting of the above product with water, and to accelerate the disintegration thereof, the roughly ground material was mechanically mixed with dried sulphite waste liquor, i. e. "Goulac". 0.67 gram of the mixture so obtained was found to disperse in 100 milliliters of distilled water at 25° C. in approximately 2 minutes. The dispersion so obtained was free of agglomerates of 2.4-dinitro-6-cyclohexyl-phenol and emulsified readily with oil.

1.9 pounds of the above described product containing the wetting agent was added to approximately 15 gallons of water and 16.6 pounds of a light lubricating oil. This mixture was rapidly agitated for several minutes, diluted to 100 gallons with water, and employed as a dormant spray for the control of insect pests.

Portions of the above roughly ground dry-mix composition were agitated with water to obtain suspensions of dinitro-cyclohexyl-phenol in a slurry of bentonite. These mixtures were adapted to be applied as insecticidal sprays in any situation requiring a light coverage of finely divided 2.4-dinitro-6-cyclohexyl-phenol upon the leaves and/or bark of insect-infested vegetation. The bentonite in this composition served as a sticking agent for the 2.4-dinitro-6-cyclohexyl-phenol, reducing the tendency for particles thereof to be dusted from the leaves of the tree following application and evaporation of the aqueous medium.

Other modes of applying the principle of my invention may be employed instead of those explained, change being made as regards the products and methods herein disclosed, provided the compositions or steps stated by any of the following claims or the equivalent of such stated compositions or steps be employed.

I therefore particularly point out and distinctly claim as my invention:

1. A composition of matter comprising as major constituents 2.4-dinitro-6-cyclohexyl-phenol and bentonite, the latter being in solid dispersion in said phenol, which composition is capable of disintegrating on contact with water to form a suspension comprising 2.4-dinitro-6-cyclohexyl-phenol in finely divided form.

2. A composition of matter comprising 2.4-dinitro-6-cyclohexyl-phenol and from 5 to 100 per cent by weight thereof of bentonite in solid suspension in said phenol, which composition is capable of disintegrating on contact with water to form a suspension comprising 2.4-dinitro-6-cyclohexyl-phenol in finely divided form.

3. A substantially anhydrous mixture of bentonite and 2.4-dinitro-6-cyclohexyl-phenol in which the bentonite is in solid suspension in the 2.4-dinitro-6-cyclohexyl-phenol.

4. A substantially anhydrous mixture of 2.4-dinitro-6-cyclohexyl-phenol and from 5 to 100 per cent by weight thereof of bentonite, in which the bentonite is in solid suspension in the 2.4-dinitro-6-cyclohexyl-phenol.

5. A composition comprising a solid suspension of bentonite in 2.4-dinitro-6-cyclohexyl-phenol and prepared by stirring bentonite into molten 2.4-dinitro-6-cyclohexyl-phenol, and thereafter cooling the mixture to solidify the same.

6. A composition of matter consisting of 2.4-dinitro-6-cyclohexyl-phenol having bentonite dispersed in solid suspension in said phenol, and a wetting agent.

7. A composition of matter consisting of 35 parts by weight of 2.4-dinitro-6-cyclohexyl-phenol, from 2 to 35 parts by weight of bentonite in solid suspension in said phenol, and up to 32.5 parts by weight of dried sulphite waste liquor as a wetting agent, which composition has the property of disintegrating on contact with water to form a suspension comprising the 2.4-dinitro-6-cyclohexyl-phenol in finely divided form.

SHELDON B. HEATH.